Feb. 16, 1926.
R. B. BENJAMIN
OUTLET FITTING
Filed Nov. 21, 1917    5 Sheets-Sheet 2
1,573,440
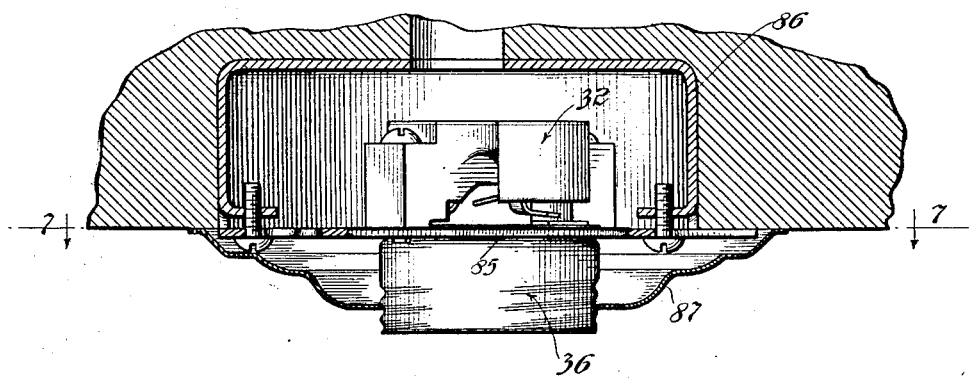
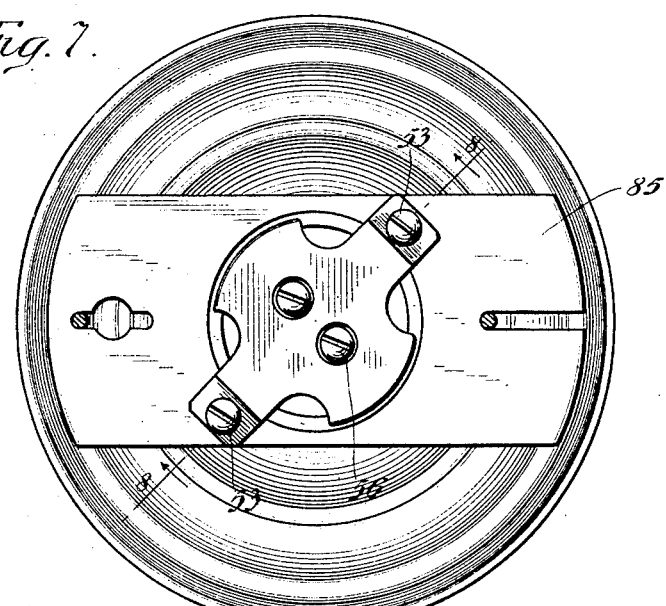
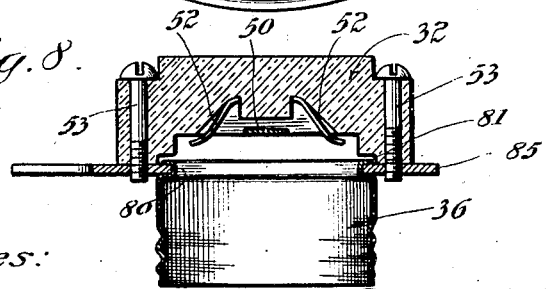

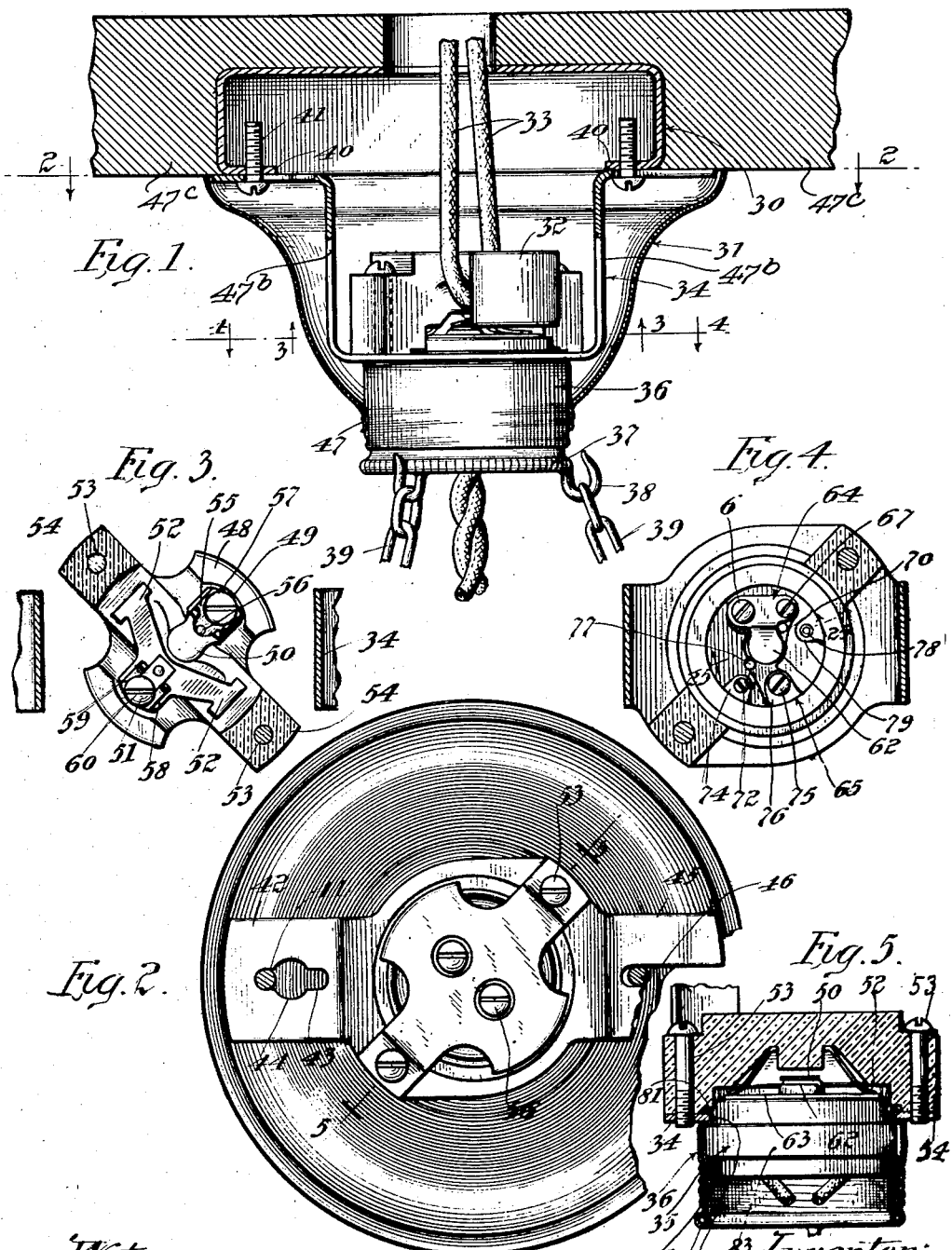

Feb. 16, 1926.
R. B. BENJAMIN
OUTLET FITTING
Filed Nov. 21, 1917
1,573,440
5 Sheets-Sheet 3
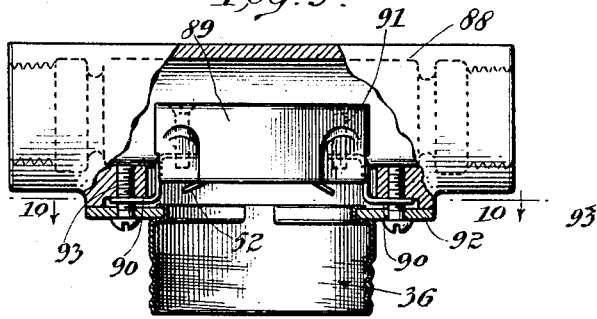
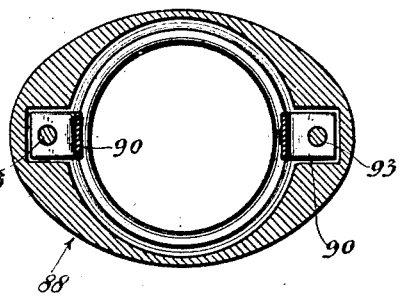
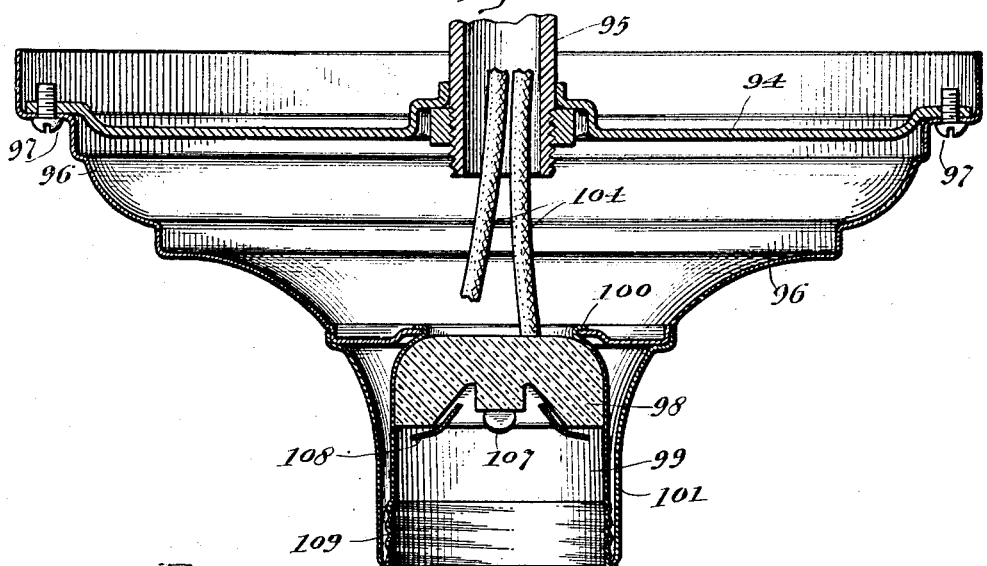
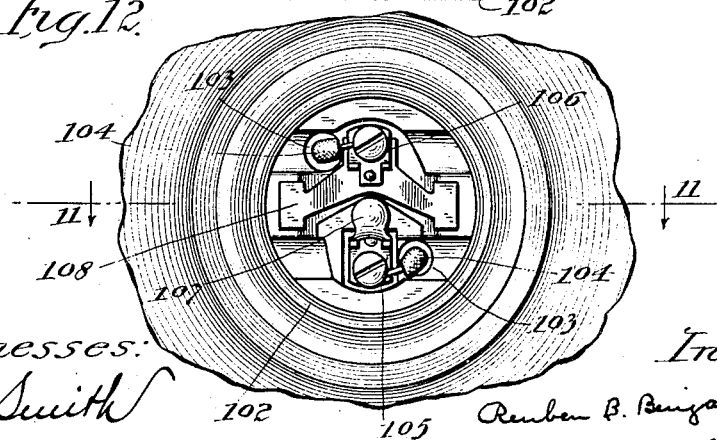

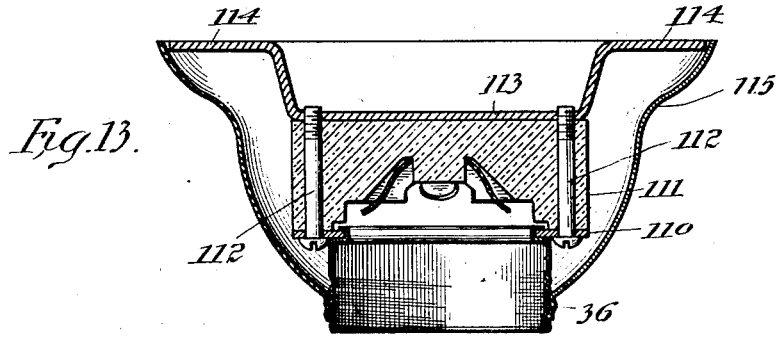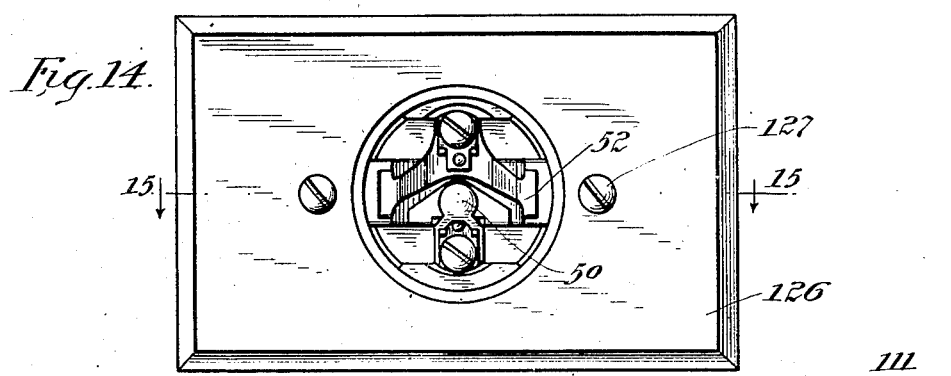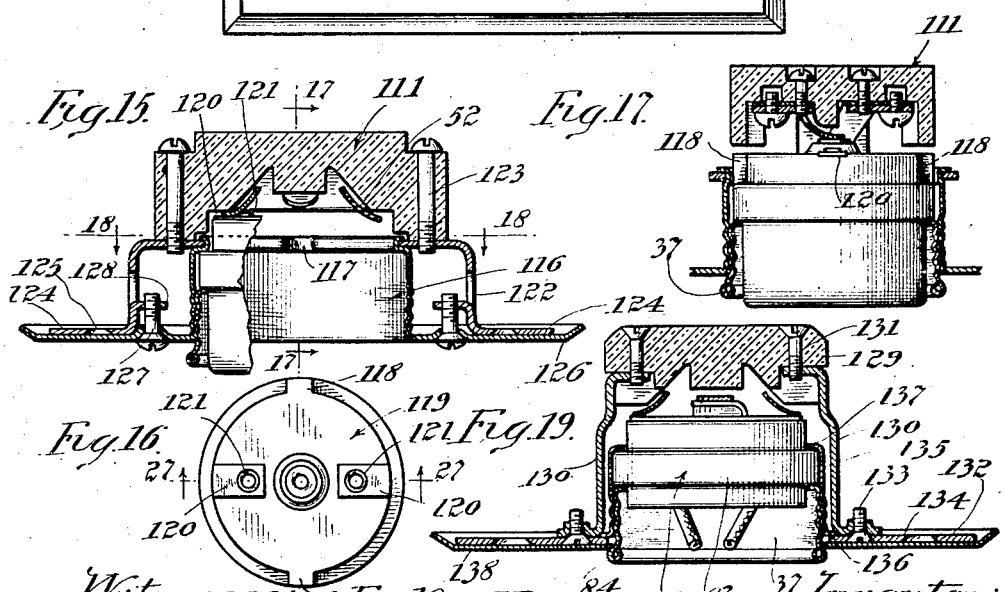

Feb. 16, 1926.
R. B. BENJAMIN
OUTLET FITTING
Filed Nov. 21, 1917
1,573,440
5 Sheets-Sheet 5
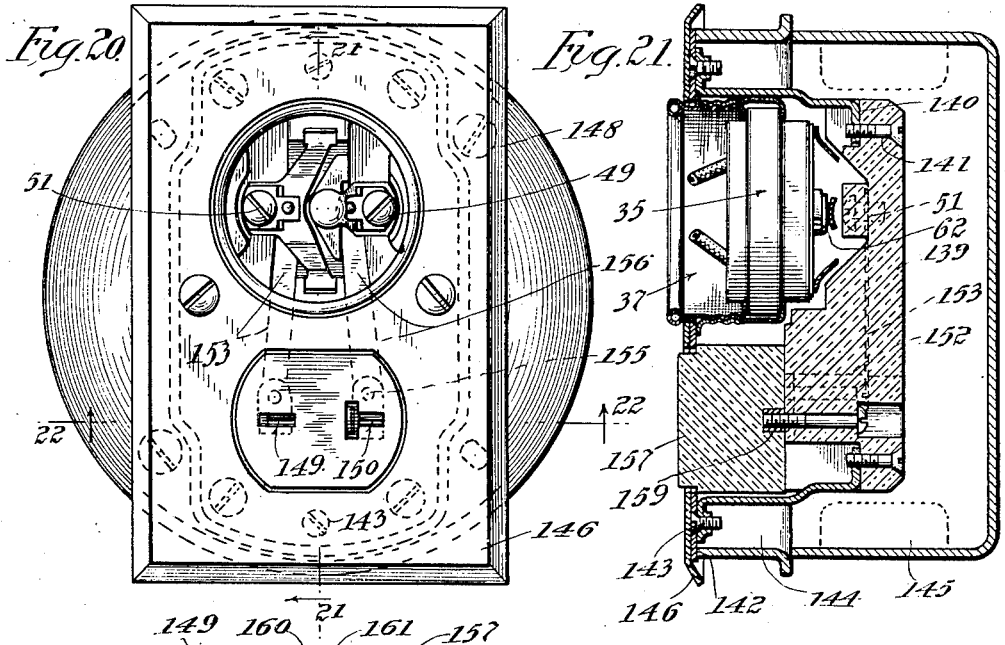

Patented Feb. 16, 1926.

1,573,440

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

OUTLET FITTING.

Application filed November 21, 1917. Serial No. 203,078.

*To all whom it may concern:*

Be it known that I, REUBEN B. BENJAMIN, a citizen of the United States, residing at Chicago, in the county of Cook and State of Illinois, have invented new and useful Improvements in Outlet Fittings, of which the following is a full, clear, concise, and exact description, reference being had to the accompanying drawing, forming a part of this specification.

My invention relates to outlet fittings.

One of the objects of my invention is to provide improved means whereby various electrical fixtures and devices can be interchangeably installed quickly and easily and without disturbing the wiring system. Further objects will appear from the detailed description to follow and from the appended claims.

In the drawings, in which various embodiments of my invention are shown—

Figure 1 is a vertical sectional view of an outlet fitting embodying my invention;

Fig. 2 is a section on the line 2—2 of Fig. 1;

Fig. 3 is a section on the line 3—3 of Fig. 1;

Fig. 4 is a section on the line 4—4 of Fig. 1;

Fig. 5 is a section on the line 5—5 of Fig. 2;

Fig. 6 is a vertical section showing another form of outlet fitting embodying my invention;

Fig. 7 is a section on the line 7—7 of Fig. 6;

Fig. 8 is a section on the line 8—8 of Fig. 7;

Fig. 9 shows another form of fitting embodying my invention;

Fig. 10 is a section on the line 10—10 of Fig. 9;

Fig. 11 is a vertical axial section of another form of outlet fitting embodying my invention, the section being on the line 11—11 of Fig. 12;

Fig. 12 is a bottom view of Fig. 11;

Fig. 13 is an axial view showing another form of my invention;

Fig. 14 is a face view of an outlet fitting showing another form of my invention;

Fig. 15 is a section on the line 15—15 of Fig. 14;

Fig. 16 is a view of the inner face of the receptacle member used in connection with Fig. 15;

Fig. 17 is a section on the line 17—17 of Fig. 15;

Fig. 18 is a section on the line 18—18 of Fig. 15;

Fig. 19 is an axial section of another form of outlet fitting embodying my invention;

Fig. 20 is a front view of another form of outlet fitting embodying my invention;

Fig. 21 is a section on the line 21—21 of Fig. 20;

Fig. 22 is a section on the line 22—22 of Fig. 20;

Fig. 23 is a section on the line 23—23 of Fig. 22;

Fig. 24 is a section on the line 24—24 of Fig. 22;

Fig. 25 is a section on the line 25—25 of Fig. 4;

Fig. 26 is a bottom plan view of Fig. 25;

Fig. 27 is a section on the line 27—27 of Fig. 16; and

Fig. 28 is a bottom plan view of Fig. 27.

Referring now to the drawings in detail, and first to the form shown in Figs. 1 to 5, inclusive, the structure here shown comprises an outlet box 30, a cover 31 for the outlet box, a wiring base 32 to which the leading-in wires 33 are connected, a bracket 34 for supporting the wiring base 32, an electrical connector device 35 for making electrical connection with the wiring base 32, an annular threaded connecting and supporting member 36 secured to the bracket 34, and an annular threaded supporting and connecting ring 37 having a screw-threaded engagement with the connector member 36, the ring 37 serving to hold the electrical connector device 35 in position and also being provided with hooks 38 to which chains 39 may be secured for supporting a suitable lamp-fixture device, such as an indirect lighting bowl, or the like.

The outlet box 30 is provided with inwardly-extending ears 40 to which the bracket 34 may be secured by means of screws 41.

In order that the bracket 34 may be attached and detached without taking out the screws 41, the foot 42 of the bracket 34 is provided with a slot 43 having an enlarged portion 44, large enough to permit the head of the screw 41 to pass therethrough, and the foot 45 of the bracket is provided with a slot 46 which is open at the outer edge. By loosening the screws 41 slightly, the bracket 34 may be detached from the outlet box 30 my slipping it sidewise until the enlarged portion 44 of the slot 43 registers with the head of the screw, slipping the foot 42 outward over the head of the screw, and then slipping the bracket sidewise still farther until the foot 45 is clear of the screw 41. The cover 31 may be of any suitable ornamental configuration, and is secured in position by means of a threaded portion 47 which engages with the threaded portion of the connecting member 36. The bracket 34 comprises, in addition to the foot portions 42 and 45, an intermediate flat portion 47ª, which carries the wiring base and receptacle member 32 and the lamp fixture device 39, two securing members 47ᵇ located on opposite sides of the axis of the lamp fixture, and extending parallel thereto, and terminating in the flat foot portions 42 and 45. It will be noted that the foot portions 42 and 45 extend laterally beyond the edges of the outlet box 30, into engagement with the material 47ᶜ surrounding the outlet box, whereby this material 47ᶜ will serve to position the bracket 34 when the screws 41 are drawn up. It will also be noted that the inner edge of the canopy 31 engages this material 47ᶜ surrounding the outlet box so that the wiring base and receptacle member 32, and the canopy 31 will both be positioned with respect to the same supporting surface, that is to say, with respect to the outer surface of the material 47ᶜ surrounding the outlet box 30.

The wiring base 32 comprises an insulating base 48, a binding-terminal 49 electrically connected with the center contact 50, and a binding-terminal 51 electrically connected with the side contact 52. The base 48 may be secured to the bracket 34 by means of screws 53 extending through openings in the seat 54 of the base and threaded into the bracket 34.

The binding-terminal 49 comprises a binding-plate 55 secured to the insulating base 48 by means of a screw 56, and comprises also a binding-screw 57 threaded into the binding-plate 55. The base portion of the center contact 50 is clamped in place on the insulating base 48 by means of the binding-plate 55.

The binding-terminal 51 comprises a binding-plate 58 secured to the base 48 by means of a screw 59, and comprises also a binding-screw 60 threaded into the binding-plate. The base of the side contact 52 may be clamped to the insulating base 48 by means of the binding-plate 58. The contacts 50 and 52 may be of sheet spring material, which yields in the direction in which the connector device 35 is inserted.

The connector member 35 comprises an insulating base 61, center and side contacts 62 and 63, respectively, supported by the insulating base 61, for engagement with the center and side contacts 50 and 52, respectively, of the wiring base, and binding terminals 64 and 65 for the center and side contacts 62 and 63, respectively, also supported by the insulating base 61 (Figs. 4, 5, 25, and 26).

The binding-terminal 64 comprises a binding-plate 66 secured to the insulating base 61 by means of a screw 67, and comprises also a plurality of binding-screws 68 threaded into the binding-plate 66. The screw 67 also extends through an opening in the base of the center contact 62 to secure the center contact to the insulating base 61. If desired, an additional binding-screw 69 may be provided for the center contact 62. This binding-screw 69 may extend through an opening in the base of the center contact and be threaded into a nut located in a recess underneath the base of the center contact. The insulating base 61 may be provided with an opening 70 for the passage of the conductor which is secured to the binding-screw 69.

The binding-terminal 65 comprises a binding-plate 71 secured to the insulating base 61 by means of a screw 72, and a plurality of binding-screws 73 threaded into the binding plate 71. The screw 72 also extends through an ear 74 on the side contact 63 and thus serves to assist in holding the side contact in place on the base 61, and also serves to electrically connect the side contact 63 and the binding-terminal 65. If desired, an additional binding-screw 75 may be provided for the binding-terminal 65. This binding screw 75 may extend through an opening in an ear 76 on the side contact 63, and may be threaded into a nut located in a recess in the base 61 underneath the ear 76. The base 61 may be provided with an opening 77 for the passage of the conductor leading to the binding-screw 75. As additional securing means for the side contact 63, an eyelet 78 may be provided extending through an opening in the ear 79 on the side contact 63, and through an opening in the insulating base 61.

The side contact 63 is circular in form, so that it will engage the side contact 52 of the wiring base no matter in what position the connector device 35 may be inserted.

The threaded connector 36 may be of formed sheet-metal, having a reduced neck portion 80 which extends through an opening in the support 34 and has its upper edge flanged over as indicated at 81, to secure it to said support.

The connecting member or ring 37 may be of formed sheet-metal having an inwardly-extending flange 82 at its upper edge, which bears against the lower face of an annular flange 83 on the insulating base 61. The lower edge of the connecting member 37 may be rolled over to add strength to the connecting member and give it a finished appearance, as indicated at 84.

In assembling the outlet fitting, the support 34 carrying the wiring base 32 and the connecting member 36, is first secured in position by means of the screws 41. The outlet-box cover 31 is then screwed on over the connecting member 36. The connector member 35 is then placed in position with respect to the connecting ring 37 so that the lowest face of the flange 83 is in engagement with the inwardly-extending flange 82, and the connector member 35 is then inserted within the connector member 36 and the connecting ring 37 is screwed into the connector member 36, which causes the center and side contacts 62 and 63 to be brought into electrical connection with the center and side contacts 50 and 52 of the wiring base.

The circuit is from one of the leading-in wires 33 to the binding-terminal 49, center contact 50, center contact 62, binding-terminal 64, through the lamp or other translating device to the binding-terminal 65, through the side contact 63, side contact 52, and binding-terminal 51 to the other leading-in wire 33.

In the form of my invention shown in Figs. 6, 7 and 8, the wiring base 32 and connector member 36 may be the same as in the form shown in Figs. 1 to 5, inclusive. In the form of Figs. 6, 7, and 8, however, the supporting member 36 is secured to a flat supporting plate 85, and the wiring base 32 is located inside a deep outlet box 86. The plate 85 may be secured to the outlet box 86 in substantially the same manner in which the support 34 is secured to the outlet box 30. A shallow outlet-box cover 87 may be screwed on over the connecting member 36. The connecting member 36 co-operates with the connector member 35 and with the connecting ring 37, just as it does in the forms of Figs. 1 to 5.

In Figs. 9 and 10 my invention is shown in connection with an electrical condulet 88. In this form the wiring base 89 is substantially the same as in the forms previously described except that it is provided with a pair of feet 90, which may be sheet-metal stampings, secured to the wiring base 89 by means of screws 91. The connecting member 36 is the same as in the forms previously described, and is secured to a flat sheet-metal plate 92, which is secured to the side of the condulet by means of screws 93, the screws 93 also serving to secure the feet 90 of the wiring base in position.

The conductors in the condulet are connected to the binding-terminals on the wiring base 89. The connector device 35 may be secured in place with respect to the wiring base 89 by means of the connecting ring 37 threaded into the connector member 36.

In the form of my invention shown in Figs. 11 and 12, a bracket 94 is secured to the end of a conduit 95, and an ornamental cover 96 is secured to the bracket 94 by means of screws 97. The wiring base 98 is secured in any suitable manner in a sheet-metal socket member 99, which is secured to the ornamental cover 96 in any suitable manner, as by flanging over the upper edge of the socket member 99, as indicated at 100. If desired, a suitable finishing sleeve 101 may be placed around the socket member 99 and secured in position by flanging over the lower edge of the socket member, as indicated at 102.

The wiring base 98 is provided with a pair of openings 103, through which the conductors 104 are led to the binding-terminals 105 and 106, respectively, for the center and side contacts 107 and 108, respectively. The connector device 35 may be secured in position with respect to the wiring base 98 by means of the threaded ring 37 screwed into the threaded portion 109 of the socket member 99.

In the form of my invention shown in Fig. 13, the connecting member 36 is secured to a sheet-metal plate 110, which is secured to the wiring base 111 by means of screws 112, which also serve to secure the wiring base to a bracket or strap 113 which extends across the rear face of the wiring base and is provided with feet 114 to be secured to an outlet box. An ornamental cover 115 may be screwed onto the connecting member 36. The use of the wiring base 111 and the connecting member 36 is the same as in the forms previously described.

In Figs. 14, 15, 16, 17, and 18 my invention is shown in connection with an outlet fitting having a flush cover for the outlet. In this form the connecting member 116 is substantially the same as the connecting member 36 previous described, except that it is provided with two opposite notches or recesses 117 (Fig. 18), which are positioned to receive the lugs or projections 118 on the connector member 119. The connector member 119 is substantially the same as the connector member 35 previously described, with the exception of the lugs 118 just referred to and the side contacts 120, which are simply two metal stampings secured to the insulating base by means of eyelets 121, in position to engage the side contact 52 of the wiring base 111 when the lugs 118 enter the notches 117. The wiring base 111 may be the same as in the form shown in Fig. 13 and may be secured to the bracket 122 by means of screws 123. The bracket 122 is provided with feet 124 having openings 125 for the insertion of screws whereby the bracket may be secured to the outlet-box. The flush cover 126 of the outlet-box may be secured in position by means of screws 127 which are threaded into lugs 128 struck up from the bracket 122. The connecting ring 37 may be the same as in the forms previously described.

In Fig. 19 I have shown another form of my invention, for use in connection with an outlet-box having a flush cover. In this form the wiring base 129 is mounted on a pair of legs or standards 130 to which it is secured by means of screws 131. The standards 130 are secured to a flat sheet-metal plate 132, by means of screws 133. The plate 132 is provided with openings 134 through which screws may be inserted to be screwed into lugs on the outlet box. The connector member 135 is provided with an outwardly-extending flange 136 which is clamped between the feet of the standards 130 and the plate 132. The inner end of the connector member 135 is provided with an inwardly-extending flange 137, which forms a shoulder with which the flange 83 of the connector member 35 engages. The connecting ring 37 may be the same as in the forms previously described. In this form, however, the rounded rolled-over outer edge of the ring 37 may serve to hold the finishing cover 138 in position.

In Figs. 20, 21, 22, 23, and 24 my invention is shown in connection with a duplex receptacle. In this form of my invention the wiring base 139 is secured to standards 140 by means of screws 141. These standards 140 are in turn secured to the flat sheet-metal plate 142 by means of screws 143. The plate 142 may be secured in any suitable manner to the outer portion 144 of the outlet-box. The inner portion 145 of the outlet-box may be circular in form, whereas the outer portion 144 may be rectangular in form to conform to the finishing cover 146, which in this type of receptacle is usually rectangular. The rectangular outer portion 144 of the outlet-box may have an outwardly-extending flange 147, circular in outline, which extends over the edges of the inner circular portion 145 of the outlet-box. The outer portion 144 may be secured to the inner portion in any suitable manner, as by means of screws 148 extending through the flange 147 and threaded into suitably-positioned lugs on the inner portion 145 of the outlet-box.

The connector member 35 and the connecting ring 37 may be the same as in the forms previously described. The ring 37 may assist in holding the ornamental cover 146 in place, as in the form shown in Fig. 19.

In this form of my invention means are provided for the attachment of a quick-detachable connector device, such as the cap of a separable attachment plug. For this purpose quick-detachable contacts 149 and 150 are secured on the insulating base 139 and electrically connected with the binding-terminals 49 and 51 of the wiring base. The quick-detachable contact 149 is secured to a metal stamping 151, which is electrically connected with the binding-terminal 51 by means of a screw 152 and a conductor strip 153. The screw 152 also serves to hold the metal stamping 151 in position on the base 139. In a similar manner, the contact 150 is secured to a metal stamping 154, which is electrically connected with the binding-terminal 49 by means of a screw 155 and a conductor strip 156.

An insulating member 157 is provided for housing and insulating the contacts 149 and 150. This member 157 is secured to the base 139 by means of a screw 158 extending through an opening in the base 139 and threaded into a nut 159 which is imbedded in the insulating member 157. The member 157 is provided with suitable recesses 160, 161 in which are located the contacts 149, 150, respectively.

The circuit for that part of the receptacle just described is from the binding-terminal 49 through the conductor strip 156, screw 155, stamping 154, contact 150, through the co-operating connector device and translating device, to the contact 149, and through the stamping 151, screw 152, and conductor strip 153 to the binding-terminal 51.

In Figs. 27 and 28 is shown a form of connector device which may be used in connection with the various wiring bases previously described, and which may be held in position with respect to these wiring bases by means of the threaded connector ring 37.

This connector device comprises an insulating base 162, center and side contacts 163 and 164 supported by the insulating base 162, for engagement with the center and side contacts of the wiring base, and center and shell contacts 165 and 166, respectively, electrically connected with the center and side contacts 163 and 164, respectively. The center and shell contacts 165 and 166 are constructed to receive and engage the corresponding contacts of a lamp-base or other insertable device. The center contact 163 may be the upper end of an eyelet 167, the lower end of which extends through the center contact 165 to secure it on the base 162. The shell contact 166 may be held upon the base 162 and electrically connected with the side contact 164 by means of eyelets 168. The insulating base 162 is provided with an annular flange 169 the lower edge of which is engaged by the inwardly-extending flange 82 of the connecting ring 37 when the base 162 is in position with respect to the wiring base.

This application is a continuation, so far as concerns common subject-matter claimed herein, of my copending application Serial No. 36,819, filed June 28, 1915, outlet fittings.

I claim as new and desire to secure by Letters Patent of the United States:

1. An electrical connector device comprising an insulating arch-shaped support, wing portions extending laterally from the central portion of said arch, two wiring terminals, one supported by each wing portion, and two contact members, one connected with each wiring terminal and each having a contact portion embraced by the arch.

2. An electrical connector device comprising an arch-shaped insulating base having two wing portions extending from the central portion of the arch on opposite sides thereof, two wiring terminals one supported by each wing portion, a U-shaped contact member having its central portion connected to one of said wiring terminals and the ends of its arms lying within said arch and forming contact portions, and a second contact member secured to the other wiring terminal and having a contact portion lying between the arms of said U-shaped contact.

3. An electrical connector device comprising two separable connector members, one of said separable connector members having a center contact member and a side contact member, said side contact member comprising a substantially V-shaped member having arms straddling said center contact and having its central portion secured adjacent said center contact.

4. An electrical connector device comprising two separable connector members, one of said separable connector members comprising an insulating base having a center contact member and a side contact member mounted thereon, said side contact member comprising a substantially V-shaped contact member having arms straddling said center contact and having its central portion secured adjacent said center contact, and a binding plate for clamping the central portion of said side contact member on said insulating base.

In witness whereof, I have hereunto subscribed my name.

REUBEN B. BENJAMIN.